May 6, 1969  M. A. BERGOUGNOU  3,442,028

GAS-SOLIDS CONTACTING STRUCTURE

Filed Aug. 12, 1966

M. A. BERGOUGNOU INVENTOR

BY L. C. Proctor

PATENT ATTORNEY

United States Patent Office 3,442,028
Patented May 6, 1969

3,442,028
GAS-SOLIDS CONTACTING STRUCTURE
Maurice A. Bergougnou, Madison, N.J., assignor to Esso Research and Engineering Company, a corporation of Delaware
Filed Aug. 12, 1966, Ser. No. 572,102
Int. Cl. F27b *17/00, 15/10*
U.S. Cl. 34—57    19 Claims

ABSTRACT OF THE DISCLOSURE

A plate, or mechanical distributing (or redistributing) device for improving contacting in chemical reactions, or physical inner actions, between fluids and fluid-like materials, particularly between fluids and particulate fluidized solids. The plate, which in use is disposed across a flow path, is characterized by a plurality, i.e., an array or distribution, of bin-like modules. Each module is defined by sidewalls which taper inwardly and downwardly, completely encircling and terminating in a bottom central nozzle opening. The sidewalls of a module are provided with relatively small openings, and the net flow of fluidized solids, or heavy materials, is through the bottom central opening while lighter fluids or gases flow upwardly through the side openings. The plates are particularly useful for the treatment of solids and gases at high temperatures, particularly when the plates are used in parallel array as baffles. They are especially adaptable for use in high temperture fluidized iron ore reduction reactions.

---

This invention relates to the art of fluid-solids contacting, especially to distribution or redistribution devices or apparatus for carrying out chemical reactions, or physical interactions between fluids, particularly between fluids and particulate solids. In particular, it relates to new and improved mechanical contacting devices for improving the gas-solids contacting characteristics in fluidized beds, especially in the beds of direct iron ore reduction processes.

In fluidized solids apparatus, a porous or perforated member is generally horizontally disposed or extended across the path of flow, or flow area, in a vessel for supporting the solids, or for effecting uniform distribution of the fluid, or both. Where such member is employed primarily for support of a fluidized bed, the pressure drop across the member is usually high and the member is generally referred to as a grid. When such member is located within a bed of solids and employed primarily for effecting better fluid solids contact, it is generally referred to as a baffle, or mechanical distributing device (or redistributing device, since it can be used to redistribute fluids distributed by a prior grid or baffle). The pressure drop across such member is generally low, as contrasted with grids, to allow for downflow of solids.

Grids are foraminous, porous, or perforated plates horizontally disposed across a flow area and fluids, e.g., gases, are injected through the grid from below to fluidize particulate solids supplied from above to form a fluidized bed at the upper side of the grid. Solids are not permitted to flow downwardly through the member. The grid thus forms a boundary for the solids, as it were, as well as a support for the solids of the bed. Some baffles, on the other hand, are also foraminous, porous, or perforated plates, but these are generally physically located within the fluidized bed rather than located at a boundary. The baffles can be either horizontally or vertically disposed. Often, in fluidized processes, the baffles are horizontally disposed and one or, most often, a plurality thereof can be located within a single bed to redistribute the fluids.

Many processes are described in the art wherein horizontal baffles are employed. These includes, e.g., sulfur dioxide lube extraction operations, high and low temperature fluid coking operations, fluid hydroforming operations, various catalytic cracking operations, and the like.

A fluidized process of considerable importance is that relating to the direct reduction of iron ores. In a typical process, iron oxides are progressively reduced in a single vertical reactor having a series of reduction stages, each stage containing a separate fluidized bed of particulate oxidic iron ore at different levels of oxidation. A prepared particulate ore is fed into the top stage, the ore flowing continuously via downcomers from one bed to the next bed or stage of the series, countercurrent to a flow of ascending hot reducing gas which consists generally of mixtures of carbon monoxide and hydrogen.

The individual beds are operated at the same or different elevated temperatures ranging generally from about 900° F. to about 1800° F., or more generally from about 1200 to about 1500° F. In the first stage, or stages, the oxides are reduced generally from the ferric oxide state to magnetic oxide of iron; in a subsequent stage, or stages, from magnetic oxide of iron to ferrous oxide; and finally, in a further stage, or stages, from ferrous oxide to substantially metallic iron. The reduced iron product, ranging from about fifty to about ninety-five percent metallization, is withdrawn from the final stage of the series, and is usually agglomerated or briquetted in a press. In some instances, a melting step has also been provided.

A problem in many of these processes is that relating to grid fouling. The problem of preventing grid fouling or plugging differs considerably from one type of fluidized process to another, and often the problem is more difficult to overcome in one process as opposed to another. This is particularly so as regards the problems encountered in the reduction of iron ores as contrasted with certain other fluidized processes. In fluidized iron ore reduction processes, such problems are especially acute. In fact, the problem differs drastically from one of the several stages of the fluidized iron ore reduction operation, as compared with another. Major difficulties are associated with the ferrous reduction stage, or stages, i.e., that wherein the oxides are reduced, or partially reduced, from ferrous oxide to metallic iron. The problem is particularly acute where the ferrous reduction proceeds over a plurality of progressive stages and, oddly enough, is most severe in the stages preceding the final reduction stage.

It has been postulated that "grid-hole plugging" is associated with adherence of the more finely divided metallic particles, i.e., "fines," to the surfaces surrounding the grid holes. The fines, ranging generally in size from about 325 mesh (Taylor series) and smaller, are blown into the openings to stick to the surfaces surrounding the grid holes or openings, gradually building up and forming deposits which obstruct further passage of gas so that contacting efficiency between gases and solids is drastically impaired. This results also in higher pressure drops across the grids and ultimately there is a necessity of complete shutdown to effect grid cleaning. Grid hole plugging is especially high when gases at high velocities are passed through the grid holes.

Even aside from the problems of grid fouling, the fluidizing medium injected into a conventional fluidized bed, even in the presence of a grid, segregates from the solids as bubbles, i.e., areas of dilute solids phase concentration surrounded by solids particles in emulsion or dense phase concentration. Hence, e.g., in a fluidized iron ore reduction process, the fluidizing gas has a tendency, in its ascent through the reactor, to seek and follow a path lying at the center of the bed, and there the finer bubbles coalesce into larger bubbles. Simultaneously, solids, in dilute phase, ascend through the center of the bed in the wake of the bubbles, or are entrained and caused to reflux downwardly along the walls at the sides of the reactor. This pattern for gas-solids flow, known as "Gulf Stream flow," results in the undesirable segregation of gases and solids, this negating the very basic function of the fluidized bed, viz., the efficient contacting between gases and solids.

In fluidized solids systems also, the entire volume of the reactor is not effectively utilized. To achieve sufficient fluids solids contacting, the practice is to prvoide several individual shallow beds. This, inter alia, is expensive. Elimination of a multiplicity of distinct beds without substantial loss in contacting efficiency is very desirable.

Conventional horizontally disposed baffles are similar in function operation to dual-flow sieve trays, most often used for countercurrent contacting of fluids, e.g., a liquid with a lighter or immiscible liquid, or with a gas, as in fractionating columns, stripping columns, liquid-liquid extraction columns, and the like. These are characterized as plates with uniform openings or perforations therethrough, these perforations being arrayed or dispersed, generally uniformly, across the surface of the plate. The plate can be flat, and sometimes is corrugated, but the function is similar. Each perforation intermittently passes one type of fluid and then another, and hence the name "dual-flow."

A disadvantage of such structures is that maldistribution or segregation of the different fluids can take place. Maldistribution is a state of partial or total segregation wherein, e.g., one type of fluid flows in one direction on one side or portion of the baffle, and in another direction on the other side, or at another portion, of the baffle. This is particularly likely to happen with large diameter plates, especially where the plate is not perfectly horizontal; and the provision and continuation of such condition is extremely difficult to assure in practice. Thus, the heavier fluid is likely to channel on the side to which the plate is or becomes slanted, and the lighter fluid is likely to channel on the other.

The primary object of the present invention is to obviate these and other prior art problems. In particular, it is an object to provide distribution means whereby bubbles can be more readily dispersed and controlled to provide more efficient fluids or fluids-solids contacting. More particularly, it is an object to lessen the problems of grid pluggage, and to substantially alter or overcome the normal Gulf Stream flow patterns by redistribution and change of the normal flow pattern of both solids and gases in a fluidized bed, or beds. It is also an object to provide combinations wherein fluids and solids are more effectively treated in dilute phase regions, located below the emulsion phases. A further object is to provide baffles which segment tall beds to lessen or eliminate the necessity of using high pressure drop grids and downcomers, especially in fluidized solids treating.

These and other objects are achieved in accordance with this invention by providing novel apparatus for dividing a fluid bed, especially a fluidized solids bed, across its diameter into a plurality or array of modules. The structure contemplates a plate for horizontal location across a flow area, said plate being provided with an array or plurality of bin-like modules or elements dispersed thereacross, each of which modulates and controls the flow pattern of fluids or of solids and fluids, e.g., gases and solids. An individual module is provided with an enclosing side wall which, when the plate is located in place, converges inwardly from top to bottom, leaving a generally central opening at the bottom thereof. The converging side wall of the module is perforated or provided with one, but preferably a plurality of holes or openings located on a common plane.

In normal operation, relatively heavy fluids or solids channel downwardly through the central opening, while relatively light fluids, e.g., gas, bubble upwardly through the holes in the side wall of the bin. In effect, then, the plate thus incorporates a series of nozzles which converge or taper downwardly, creating a structural element which causes preferential passage of relatively heavy fluids or solids through the bottom bin hole, while bubbles of relatively light fluids are channeled upwardly about the periphery of the converging end of a module to entrain the relatively heavy fluids or solids. In this manner, the effectiveness of the overall bed in fluid solids distribution and contacting is significantly increased, each module in effect acting as an individual bed of small diameter. In this manner, the Gulf Stream effect is eliminated or drastically suppressed and the more effective portions of the bed diameter is spread across the whole cross section of the bed.

The individual nozzles are so formed to provide flow coefficients wherein pressure drops are relatively low, e.g., up to about 0.3 pound per square inch in the direction of the taper. Conversely, pressure drops are very high, when flow is in the opposite direction. Relatively heavy fluids or solids tend to settle, and more heavy fluids or solids therefore are pushed out of the central opening or bottom bin hole than out of the side openings since the static pressure is higher at the bottom bin hole. Thus, because of the slope, the bin inhibits or suppresses the tendency of, e.g., relatively light fluids or gas to flow upwardly through the bottom bin hole, and hence there is no obstruction to heavy fluids or solids downflow. Gas or fluid, of relatively low density as contrasted with the heavy fluids or solids, on the other hand, flows or ascends through the side openings because of the higher pressure drop created when the tendency is for the light fluid or gas to flow through a nozzle from the small end. In certain embodiments, under the central opening there is located a solid shape or barrier which offers an obstruction to upflowing fluids or gases and further lessens the likelihood of the lighter fluid or gas entering this outlet. But, on the other hand, it is spaced sufficiently far from the opening as not to block or interfere with downflowing solids.

The side openings of the individual modules are so numbered as to provide good dispersion of the entering light fluid or gas, and so sized that the velocity of the ascending light fluid or gas is accelerated at the time of passage through the openings. In the regions between the lower side of the modules the lighter fluid or gas and the heavier fluid or solids are in dilute phase concentration. The total structure or plate thus provides a zone of intense dilute phase fluids or solids-fluids mixing at the lower side of the structure, between the individual modules or bins. At the bottom of a module or bin, relatively heavy fluids or solids are entrained by ascending fluids, e.g., gases, which move at high acceleration into and through the side openings in the wall of a bin. The recycled heavy fluids or solids, so contacted at the relatively high slit velocities and re-entrained by the light fluids or gases, are carried above the plate and caused to again recycle downwardly to the dilute phase regions below the baffle. The higher the flow of heavy fluids or solids through the central opening of a bin and the higher the heavy fluids or solids loading of the dilute phase, the greater the contacting efficiency between gas and solids.

In accordance with a preferred embodiment, an alternate series of dense and dilute phases is created throughout a bed by spacing apart a plurality of the plates along parallel planes. On top of each plate, the light fluid or gas phase is discontinuous (small bubbles) and the relatively heavy fluid or solids phase is continuous. On the other hand, beneath the plate the light fluid or gas phase is continuous and the heavy fluid or solids phase discontinuous. In this manner, by providing a plurality of plates across several cross-sections of bed level, the fluids-solids emulsion is redistributed, both the light fluids or gases from the emulsion and the bubble phases are remixed and redistributed, and a more effective fluids or fluids-solids system is provided.

These and other features of the invention will be better understood by reference to the following detailed description, and to the attached drawings to which reference is made in the description. The description depicts use of the baffles in a fluidized iron ore reduction process; and specifically, the baffles are located at the ferrous reduction stage of the process wherein particle sticking is acute. The baffles have demonstrated particular utility for use in such processes.

Figure 1:
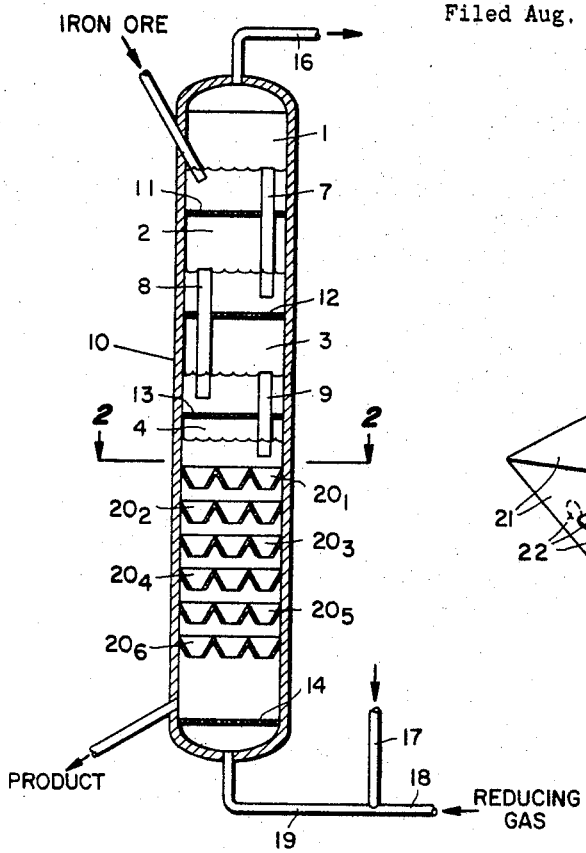
FIGURE 1 shows a multistaged fluidized bed in cross-section and in frontal elevation.

Referring to the drawings, particularly to FIGURE 1, iron ore is charged into the top of reactor 10, and into stage 1 which, most often, is a low temperature preheat zone where little or no reduction takes place. The preheated ore from stage 1 is flowed downwardly via a standpipe 7 to zone 2 which is operated at a temperature sufficient to reduce ferric oxide to substantially magnetic oxide of iron, or a mixture approximating the formula $Fe_3O_4$. The partially reduced solids are overflowed from stage 2 via a standpipe 8 to stage 3 wherein the magnetic oxide of iron is converted to substantially ferrous oxide. Ferrous oxide from stage 3 is overflowed via standpipe 9 to stage 4, which is staged by use of a plurality of plates 20 constructed in accordance with a preferred mode of practicing the present invention.

Stage 4, the stage wherein metallization is initiated, and completed to the desired degree, is in effect divided into a further number of alternate stages by means of baffles $20_1$ through $20_6$. The last baffle of the series, viz., $20_6$, can be employed as the last plate at the bottom of the reactor 10 but preferably, since there is flow of solids through baffles, a more conventional grid 14 is provided across the bottom of the reactor 10, as illustrated. A relatively simple grid 14, in fact, might be employed since the very last stage of the series is rarely disturbed by grid pluggage and fouling. The grids 11, 12, 13 can also be of more simple construction and plates 20 can be used at these locations. Stages 1, 2 and 3 can thus also be provided with a plurality of plates 20 to further stage the reaction.

The reducing gas, which is a reactant as well as a fluidizing medium, fed into reactor 10 via line 19 can be a fresh reducing gas consisting essentially of a mixture of carbon monoxide and hydrogen such as one generated or formed by partial oxidation of hydrocarbons or by the steam reformation of hydrocarbons. Reducing gas from other sources can also be employed. Reducing gas from the top of reactor 10, which exits therefrom via line 16, can be regenerated by removal of oxidized components, if desired, and reintroduced via line 17 with fresh makeup gas which enters the reactor 10 via lines 18, 19 from a reducing gas "generator" (not shown). The reducing gas can be regenerated by generally conventional means, e.g., by scrubbing with an adsorbent to remove the carbon dioxide, or by refrigeration to remove water, or both.

Figure 3:
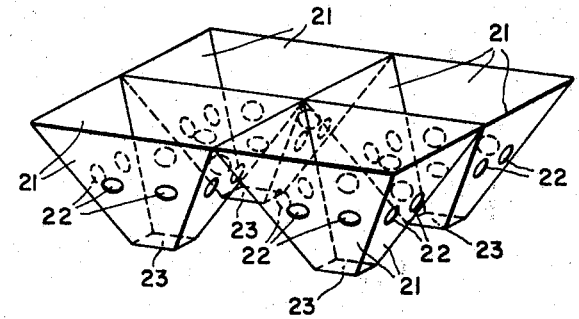
FIGURE 3 is a detailed perspective view of a group of bins or modules of the baffle of the invention.
Figure 2:
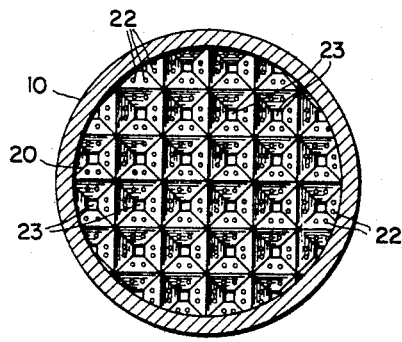
FIGURE 2 is a top view of FIGURE 1 taken along lines 2—2.

One of the plates or baffles 20 is shown by a reference to FIGURE 2. The plate or baffle 20 is provided with a plurality or array of bin-like modules, preferably symmetrically distributed across the plate, to control both gas and solids flow. Each of the modules (referring to any of the modules of FIGURES 3) is provded with a plurality of sloping sides 21 forming an enclosing wall which converges to form a frusto-conic opening 23 which faces downwardly when the plate 20 is in place in the reactor 10. It is this central opening 23, hereinafter referred to as a bin hole opening 23, through which the net flow of solids is downwardly in normal operation. In side walls 21 are also located a plurality of side openings 22, hereinafter referred to as gas holes 22, through which gas bubbles, or sweeps upwardly, in normal operation. Thus, each module is in effect a nozzle which contains, preferably, a plurality of gas holes 22 in an enclosing side wall, and a solids hole, or bin hole opening, at its bottom.

A feature of a baffle 20 is that each solids hole, or bin hole opening 23, is located at the very bottom of the module, and each sloping wall 21 of the individual modules are fitted together and contiguous one to the other so that flat spaces and curved surfaces are completely eliminated. The lateral movement of solids which flows downwardly into the individual modules is obstructed, and the solids cannot thus run or flow horizontally from one side of the structure to the other. There is thus provided positive horizontal distribution of the solids across a baffle 20. Further, due to the elimination of flat spots and curved surfaces between the bin hole openings 23, sticky solids cannot settle or stick between the openings 23. Hence, the problem of sticky materials settling and sintering to form aggregates which eventually plug openings is avoided. Furthermore, because only sloping surfaces are provided, the heavier solids are assigned a definite path of travel toward the bottom of the reactor 10 while, on the other hand, gas flows upwardly without obstruction, and is therefore readily distributed through the side wall openings 22. Thus, descending solids and ascending gases do not have to force their way through the same openings.

In accordance with the best mode of the invention, a module is characterized by a plurality of gas holes, preferably by the presence of at least about four individual gas holes 22, located on common plane, to assure effective gas dispersion. More preferably, however, from about 8 to about 16 gas holes 22 are provided, and preferably only a single solids outlet hole 23 is provided. The solids outlet hole 23 is of larger cross-sectional area than a single gas opening 22 and preferably ranges up to about five times the cross-sectional area. More preferably, the cross-sectional area of a solids outlet hole 23 ranges from about 1.3 to about 3 times the cross-sectional area of a gas opening 22.

Figure 4:
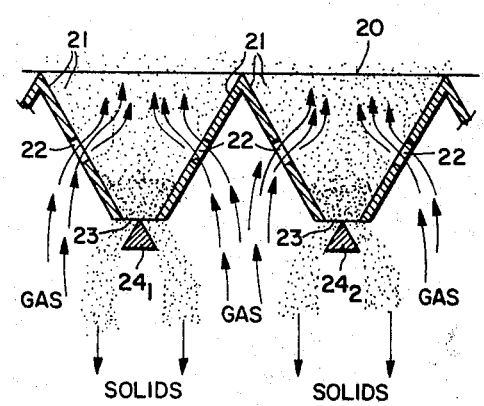
FIGURE 4 is a cross-sectional view of two adjoining modules showing the flow pattern of the gases.

In a further embodiment, as shown by reference to FIGURE 4, a solid surface, $24_1$, $24_2$, or baffle, can be located in front of and below a bin hole 23 to aid in preventing ascending gases from entering the said opening, but yet the solid member 24 is spaced sufficiently far fro mthe bin hole opening 23 to permit free downward flow of solids through the opening. These devices are particularly useful where bin holes of large cross-sectional area are to be employed. Preferably, a solid member 24 is shaped in the form of a "Chinese hat," or pyramid, and its cross-section approximates, or is slightly larger than, that of the bin opening 23. It provides a tapered feature projecting upwardly to aid in the lateral disperse-ment of descending solids. By absorbing the impact of large bubbles which might tend to upset the flow of solids through bin hole 23, it permits the free flow of solids in the downward direction. A dilute phase is created under the plate 20, providing a zone of intense mixing for gases and solids.

The angle of slope of a side wall 21 is sufficiently great to permit free flow of solids down the inside of the side walls and through a bin hole 23. This means that the angle of a side wall 21 must be greater or steeper than the angle or repose of the solids. For iron oxides, the angle must be at least 60°, and preferably ranges up to about 70°, measured from horizontal. The bin hole opening 23 must be of sufficient size to handle the net downflow of solids, this of course being related to the total number of modules arrayed across a plate. The size of the gas holes 22 for upward passages of gases is determined to some extent by the throughput of gases to be handled in the reactor 10, but preferably are sized to cause rapid acceleration of the gas which flows through the gas holes 22.

To achieve stable operation, the sum total area provided by the gas holes 22 of a plate 20 should range from about 5 to about 20 percent, and preferably from about 8 to about 15 percent of the total cross-sectional area across the reactor when superficial linear velocities in the reactor 10 range up to about five feet per second. When the cross-sectional areas of these dimensions are provided, the gas is forced through the openings 22 and forced to accelerate to a velocity ranging from 5 to about 20 times, and preferably from about 6 to about 12 times, the superficial linear velocity through the reactor 10. This acceleration is responsible for the creation of the dilute phase under a plate 20. Thus, the heavy solids particles cannot accelerate as rapidly as the lighter gas and hence fall behind. As the slip velocity between gas and solids increases, the density of the total mixture decreases and a dilute phase is thus formed. Upon entry of the dilute phase gas solids system into the emulsion phase above the plate, the upward progress of the dispersed solids is retarded and the solids re-enter the emulsion phase. Solids thus pour downwardly through the bin holes 23, and portions thereof are returned or recycled through the gas holes 22 at a very rapid rate and thence returned to the dense phase above the plate for recycle. By arranging a number of these plates 20 in parallel, a fluidized bed is further staged and takes on the characteristics of a series of alternating dilute and dense phase zones, respectively.

The total area of the bin holes 23 will depend on the size of the module (bin) used, the amount of solids downflow that is to be provided, the amplitude of the baffle and the pressure drop through the baffle. The amplitude is defined as the vertical distance between parallel planes, one passing across a bin hole opening 23 and the other through the gas holes 22. Although the descending solids in the bins are close to being deaerated, they are still "fluffed up" and exert hydrostatic pressure by pressure traverses made through the bins. One can thus apply the conventional orifice equation to the flow of solids through the bin hole, i.e., $$V_S = C\sqrt{2hg}$$

where:

$V_S$ is the linear velocity of the solids through the bin hole.
C is the orifice coefficient for solids downflow through the bin hole.
$h$ is the effective driving force for the flow of solids through the bin hole expressed in height of "fluffed" bin solids. $h$ is equal to the amplitude of the baffle in feet minus the pressure drop of the mixture (gas plus solids) flowing through the gas holes equally expressed in feet of "fluffed bin solids."

In a typical situation, for instance, the total bin hole area for a given baffle plate ranges from about 3 to about 10 percent of the cross-sectional area of the reactor for 20 to 50 pounds per cubic foot solids, and from about 1 to about 3 percent of the same cross-sectional area for 150 pounds per cubic foot solids, if the same weight of downflowing solids is desired.

Baffles should be spaced with clearances, i.e., from the top of one baffle to the bottom of the next of the series, ranging from about 10 to about 50, and preferably from about 15 to about 30 percent of the diameter of the reactor 10. From about 3 to about 10 baffles, and preferably from about 5 to about 8 baffles, are used in staging the ferrous reduction zone of a fluidized iron ore reduction system; and where total staging of the entire series of iron ore reduction reactions is desired, from about 2 to about 4 times this number of baffles should be employed. More generally, however, the total number of baffles to be used depends on the characteristics of the baffles and on the solids staging desired.

Baffles used in accordance with this invention thus effectively "modularizes" a bed to break the typical "Gulf Stream" pattern found in conventional processes. It provides excellent contacting zones in the dilute phase which is established beneath the baffles, this dispersing the lighter fluids or gases keeping the bubble population small to break up the lighter fluid or gas flow pattern. The baffles provide sufficient aeration of the heavier fluids or solids and permit, e.g., operation on coarser solids, thus lessening the amount of fines, reducing sticking, and lessening the necessity of grinding. Use of the baffles also reduces bed vibrations and considerably improves general operability.

It is apparent that certain modifications and changes can be made in the present invention without departing its spirit and scope.

Having described the invention, what is claimed is:

1. Apparatus for the treatment of fluids and fluid-like materials comprising
    a plate horizontally located across the enclosing walls of a vessel defining a flow path for the said fluids and fluid-like materials,
    a plurality of individual bin-like modules symmetrically distributed about the plate,
    each individual module being provided with completely enclosing sidewalls which converge inwardly and downwardly from top to bottom leaving a bottom central opening at the smaller terminal end thereof forming, in effect, a frusto-conic shaped downwardly converging nozzle,
    perforations in the converging sidewalls of the individual modules intermediate the bottom nozzle opening and the top of the enclosing sidewalls, so that when the plate is located across the said flow path, the new flow of relatively heavy fluids and fluid-like materials of the individual modules is downwardly through the bottom central opening while relatively light fluids bubble upwardly through the sidewall perforations.

2. The apparatus of claim 1 wherein the bottom central opening is provided with a cross-sectional area ranging at least about 1.3 times that of a side perforation.

3. The apparatus of claim 2 wherein the cross-sectional area of the bottom central opening ranges from about 1.3 to about 5 times that of a side perforation.

4. The apparatus of claim 1 wherein the side walls are provided with at least about 4 perforated openings, arranged substantially uniformly about the diameter of the wall, and being located on a common plane.

5. The apparatus of claim 1 wherein the side wall of a module contains from about 8 to about 16 holes, and wherein the sum total diameter of the holes on the plate range from about 5 to about 20 percent of the total cross-sectional diameter of the plate.

6. The apparatus combination of claim 1 wherein the sum total area of the bottom central openings ranges from about 3 to about 10 percent of the total cross-sectional diameter of the plate.

7. In combination, a plurality of plates of the type defined in claim 1 distributed in parallel within a bed.

8. The apparatus of claim 1 wherein a baffle in the shape of a pyramid is placed in front of and below each bottom central opening to prevent bubbles of relatively light fluids from entering the openings and upsetting the downflow of relatively heavy fluids.

9. Apparatus for horizontal location across the flow path of a vessel used for treating fluidized solids systems with gases comprising a plate across which is distributed a plurality of individual bin-like modules, each module providing a completely enclosing sidewall which converges inwardly and downwardly from the plate leaving a bottom central opening at the smaller terminal end thereof forming, in effect, a frusto-conic shaped nozzle, the converging sidewall being provided with a plurality of openings distributed thereabout on a common plane lying intermediate a plane across the bottom central opening and the top of the wall of the module, so that when the plate is located across the flow area of a fluidized solids bed, solids are channeled downwardly through the central opening while gas bubbles upwardly through the wall perforations of the individual modules.

10. The apparatus of claim 9 wherein at least 4 gas openings are distributed about the side wall, and wherein the cross-sectional area of a bottom central opening ranges at least about 1.3 to about 5 times that of a single gas opening.

11. Apparatus for horizontal location across the flow path of a vessel used for treating fluidized solids system with gases comprising a plate across which is distributed a plurality of individual bin-like modules, each module providing completely enclosing walls with straight sides which converge inwardly and downwardly from the plate leaving a bottom central opening at the smaller end thereof forming, in effect, a frusto-conic shaped nozzle, each converging side wall being provided with one or more openings, all located on a common plane lying between a plane across the bottom central opening and the top of the enclosing wall, the top portions of said side walls being fitted together to eliminate all flat surfaces so that when the plate is located across the flow area of a fluidized solids bed, solids are channeled downwardly through the central opening without significant obstruction while gas bubbles upwardly through the wall perforations of the individual modules.

12. The apparatus of claim 11 wherein each module is provided with four straight downwardly converging side walls, and each wall contains a plurality of openings for passage of gas therethrough.

13. In combination, a plurality of plates of the type defined in claim 9 distributed in parallel within a bed of fluidized solids.

14. The combination defined by claim 13 wherein the fluidized solids are iron oxides.

15. The combination defined by claim 14 wherein the fluidized iron oxide solids are subjected to temperatures ranging from about 900° F. to about 1800° F. and partially metallized.

16. The combination defined by claim 15 wherein the bed constitutes a ferrous reduction zone.

17. The apparatus of claim 9 wherein the sum-total area of the bottom central openings ranges from about 3 to about 10 percent of the total cross-sectional diameter of the plate.

18. The apparatus of claim 9 wherein the sidewall of a module contains openings, the sum-total diameter of which ranges from about 5 to about 20 percent of the total cross-sectional diameter of the plate.

19. The apparatus of claim 18 wherein the sum-total diameter of the module sidewall openings ranges from about 8 to about 15 percent.

References Cited

UNITED STATES PATENTS 3,243,318   3/1966   Mihara et al. _____ 34—57

JOHN J. CAMBY, *Primary Examiner.*

U.S. Cl. X.R.

266—20